United States Patent [19]

Koop et al.

[11] Patent Number: 5,353,297
[45] Date of Patent: Oct. 4, 1994

[54] GAS SLAB LASER WITH FOLDED RESONATOR STRUCTURE

[75] Inventors: Dale E. Koop, Sunnyvale; Hartmuth Hecht, Mountain View, both of Calif.

[73] Assignee: Coherent, Inc., Santa Clara, Calif.

[21] Appl. No.: 90,810

[22] Filed: Jul. 12, 1993

[51] Int. Cl.$^5$ ............................................. H01S 3/03
[52] U.S. Cl. ......................................... 372/64; 372/93; 372/72; 372/92; 372/55; 372/99
[58] Field of Search ................. 372/92, 64, 55, 72, 372/87, 99, 93

[56] References Cited

U.S. PATENT DOCUMENTS

| | | | |
|---|---|---|---|
| 4,438,514 | 3/1984 | Chenausky et al. | 372/64 |
| 4,559,627 | 12/1985 | Chun | 372/92 |
| 4,651,325 | 3/1987 | Wang et al. | 372/64 |
| 4,686,681 | 8/1987 | Paranto et al. | 372/82 |
| 4,719,639 | 1/1988 | Tulip | 372/95 |
| 4,815,094 | 3/1989 | Cantoni | 372/93 |
| 4,891,819 | 1/1990 | Sutter, Jr. et al. | 372/82 |
| 5,048,048 | 9/1991 | Nishimae et al. | 372/95 |
| 5,058,122 | 10/1991 | Gekat | 372/95 |
| 5,097,479 | 3/1992 | Opower | 372/92 |
| 5,123,028 | 6/1992 | Hobart et al. | 372/95 |
| 5,177,748 | 1/1993 | Zhang | 372/18 |
| 5,210,768 | 5/1993 | Seguin | 372/92 |
| 5,216,689 | 6/1993 | Gardner et al. | 372/64 |
| 5,220,577 | 6/1993 | Opower | 372/64 |

OTHER PUBLICATIONS

P. E. Jackson, D. R. Hall & C. A. Hill, "Comparisons of waveguide folding geometries in a $CO_2$ z-fold laser," *Applied Optics*, Mar. 1, 1989, vol. 28, No. 5, pp. 935–941.

A. Lapucci & G. Cangioli, "Triple slab radio-frequency discharged $CO_2$ laser," *Appl. Phys. Lett.*, 62 (1), Jan. 4, 1993, pp. 7–9.

*Primary Examiner*—Léon Scott, Jr.
*Attorney, Agent, or Firm*—Limbach & Limbach

[57] ABSTRACT

A resonator design is disclosed particularly suited for a RF excited, carbon dioxide, slab waveguide laser. The laser includes a pair of elongated electrodes spaced apart in a manner to define a slab discharge region having a narrow waveguide axis between the electrodes and a wide axis extending parallel to the electrode surfaces. The resonator is a hybrid design and is a stable, waveguide in the narrow axis, and a negative branch unstable resonator in the wide axis. A pair of mirrors are provided at each end of the electrodes to create a folded beam path in the wide axis. The folded configuration increases the effective length of the resonator which substantially increases the power stability of the laser. The multiple mirror resonator can also be used to increase the width of the discharge region while minimizing spherical aberrations. Each leg of the path has the alignment characteristics of a negative branch unstable resonator so that the alignment of the overall resonator is highly stable.

36 Claims, 13 Drawing Sheets

ZIG-ZAG: INSIDE EDGE COUPLING

ZIG-ZAG: OUTSIDE EDGE COUPLING

GAS SLAB LASER WITH FOLDED RESONATOR STRUCTURE

TECHNICAL FIELD

The subject invention relates to a high power, gas slab waveguide laser with a compound, folded resonator structure.

BACKGROUND OF THE INVENTION

Within the last few years there has been significant interest in the development of gas slab lasers. As described in U.S. Pat. No. 5,123,028 (assigned to the same assignee herein and incorporated by reference), these type of lasers preferably include a pair of planar, rectangular electrodes, spaced apart in a manner to define a slab discharge region. The slab discharge region has a narrow axis extending between the electrodes and a wider axis extending parallel to the electrode surfaces. In the preferred embodiment, the narrow axis defines a waveguide channel between the electrodes.

A lasing gas, such as carbon dioxide, is located between the electrodes. A means is provided for energizing the electrodes to excite the gas. In the illustrated embodiment, the lasing gas is excited with an RF generator. A mirror is positioned adjacent each end of the electrodes to define the resonator.

In order to maximize the power output and enhance stability in a slab laser, it is desirable to employ a "hybrid" resonator. In a hybrid resonator, the propagation of light in one axis is different from the propagation of light in the other axis. As noted above, in the narrow axis, a stable waveguide resonator is defined. In contrast, in the wider axis, a free-space resonator is defined. Where the width of the wider axis is a few centimeters or more, the free-space resonator is defined by an unstable resonator. In the preferred design, a negative branch unstable resonator is used. In addition, one of the end mirrors of the resonator is slightly shorter than the other end mirror, so that laser beam can be "edge coupled" out of the resonator.

The assignee herein has successfully marketed lasers designed in accordance with the above cited patent, both for use in medical systems (sold under the trademark "Ultrapulse") and for industrial applications (sold under the trademark "Diamond".) Significant research activity has continued in order to further improve this product.

One area which has been investigated relates to the stability of the output power of the laser. As can be seen in the above identified patent, the resonator mirrors are mounted to the ends of a sealed laser housing. As the laser operates, the length of the housing, and hence the length of the resonator, will vary. As the length of the resonator varies, different longitudinal modes of the laser will oscillate in a phenomenon referred to as mode sweeping. It has been found that this mode sweeping phenomenon can result in power fluctuations in excess of ten percent and as much as fifteen percent. These power fluctuations can be detrimental for both medical and industrial applications.

Therefore, it is object of the subject invention, to provide an improved resonator structure which significantly improves the power stability of a carbon dioxide, slab waveguide laser.

It is a further object of the subject invention to provide a new resonator structure that improves alignment stability.

It is another object of the subject invention to provide a new resonator structure that allows the laser to operate with an increased number of longitudinal modes.

It is still a further object of the subject invention to provide a new resonator structure that provides greater tunability for single line operation.

It is still another object of the subject invention to provide a new resonator structure which allows the beam to be coupled out of the center of the slab discharge region rather than along one edge.

It is still a further object of the subject invention to provide an improved resonator structure which allows the width of the discharge region to be expanded while minimizing spherical aberrations induced by the mirrors.

It is still another object of the subject invention to provide an improved resonator structure that can be adapted for use with other lasers having slab-shaped gain regions, such a solid state slab lasers.

SUMMARY OF THE INVENTION

In accordance with these and other objects, the subject invention provides for a unique resonator design wherein the beam path is folded in the wide or free-space axis. In the basic embodiment, two mirrors are located at each end of the electrodes. A folded path is defined which causes the beam to traverse the discharge space six times as compared to only twice in the prior art design.

By increasing the path length within the discharge region by a factor of three, the number of longitudinal modes which can oscillate within the laser is similarly increased. By increasing the number of modes which can oscillate, the fluctuations in power associated with the variations in the length of the resonator are substantially reduced. In initial experiments, fluctuations in power with the subject resonator were less than one percent as compared to the ten to fifteen percent associated with the standard resonator design. The three-fold increase in the number of times the beam passes through the gain region can also lead to an increase in operating efficiency.

In the preferred embodiment, the curvature and orientation of the mirrors are selected to define a compound resonator, wherein the mirrors bounding each path define separate resonator-like structures. Thus, the propagation between each mirror pair defines a stable waveguide in the narrow axis and a negative branch unstable configuration in the wide axis. In the wide axis, the mirrors are arranged in a confocal relationship which creates a focus between the mirror pairs. This unique compound resonator leads to enhanced alignment stability.

Another advantage to the subject design is that it allows the beam to be coupled out of the center of the laser, rather than at an edge. In one embodiment illustrated below, a space is provided between one of the pairs of mirrors located at one end of the electrodes. In this configuration, the laser beam is coupled out of the resonator through the space between the mirrors.

The subject resonator can be modified to include three or more mirrors at each end of the electrodes, creating a greater number of folds. By increasing the number of folds, the width of the electrodes can be easily increased so that the power output per unit length can be increased. In the prior design, there were practical limits to the width of the electrodes. More specifically, as the electrode width was increased, the mirror width had to be increased as well. Increasing the mirror width introduced unwanted spherical aberrations into the optical system. By using multiple mirrors at each end of the resonator, the spherical aberrations can be minimized.

Further objects and advantages of the subject invention can be appreciated from the following detailed description taken in conjunction with the drawings in which:

BRIEF DESCRIPTION OF THE DRAWINGS

FIG. 10 is a cross-sectional view looking down onto the top of the upper electrode.

FIG. 11 is an elevational view from the right hand side of FIG. 10.

FIG. 12 is an elevational view from the left hand side of FIG. 10.

FIG. 13 is a cross-sectional view taken along the line 13—13 in FIG. 10.

FIG. 14 is a cross-sectional view taken along the line 14—14 in FIG. 10.

FIG. 15 is an exploded perspective view of the end cap 114 shown in FIG. 10.

DETAILED DESCRIPTION OF THE PREFERRED EMBODIMENTS

Figure 1:
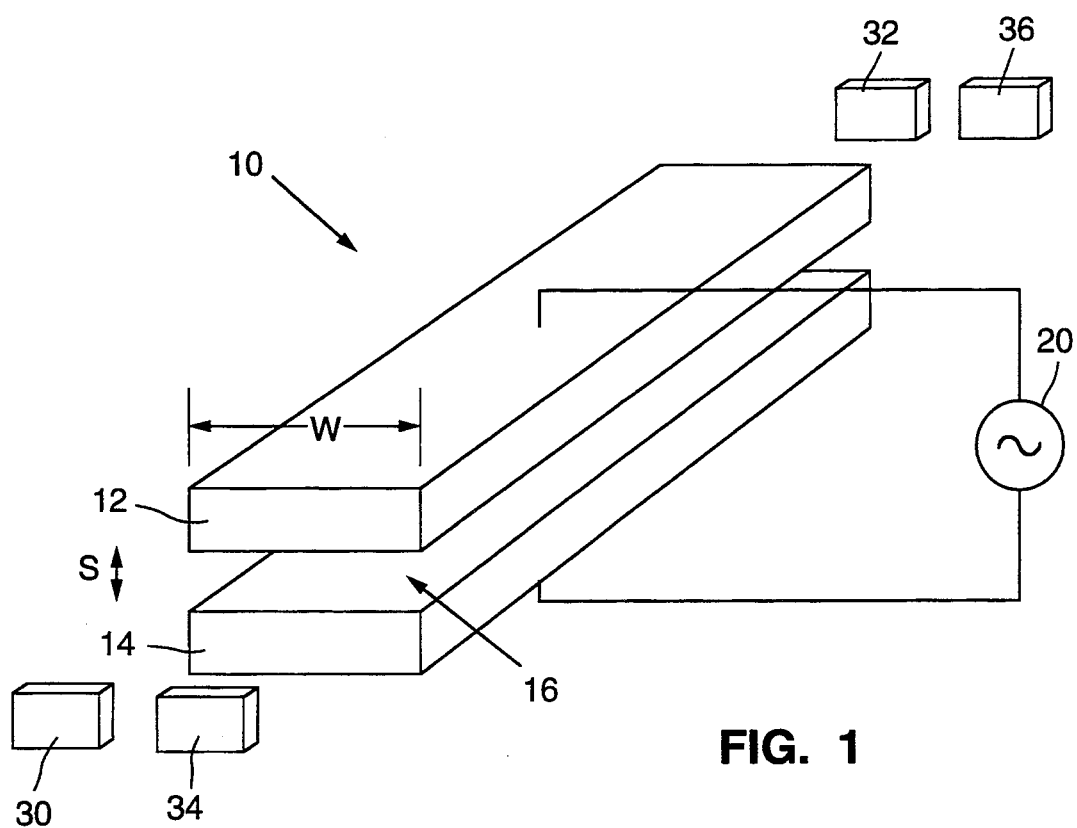
FIG. 1 is a perspective schematic illustration of an RF excited, slab waveguide resonator including the compound resonator of the subject invention.

Referring to FIG. 1, a laser 10 is shown having a pair of elongated, rectangular planar electrodes 12 and 14. The electrodes are positioned in a manner to define a discharge region 16 which has a slab or rectangular configuration. As seen in FIG. 1, the spacing S between the electrodes is relatively small and defines the waveguide axis. This spacing is typically on the order of 2 mm. In contrast, the width W of the electrodes is significantly larger, on the order of 4 to 5 cm.

A lasing gas is disposed in the discharge region 16. As noted in the above cited patent, in the commercial embodiment, the electrodes are mounted in a sealed housing which also contains carbon dioxide as the lasing gas. The gas is excited by an RF generator 20 which is connected to the electrodes through a suitable matching network (not shown). Additional details about the design of the laser can be obtained by referring to U.S. Pat. No. 5,123,028.

As noted in the above cited patent, the resonator is defined by mounting a first mirror adjacent one end of the electrodes and a second mirror adjacent the other end of the mirror. In the prior design, spherical mirrors were selected in a manner to define a hybrid resonator. More specifically, a waveguide resonator (where the propagation of light is controlled by the electrode surfaces) is defined in the narrow axis. In contrast, a negative branch unstable resonator (where light propagation is only controlled by the mirrors) is defined in the wider axis. The basic principles of this hybrid design are carried forth in the preferred embodiment of the subject invention.

As can be seen in FIG. 1, in the subject resonator design, a pair of mirrors 30, 34 and 32, 36 are located at each end of the electrodes 12, 14. Assuming that the width of the electrodes is the same as in the prior art design, the width of each mirror 30-36 would be roughly half the width of the prior mirrors. The curvature and orientation of the mirrors are arranged so that beam path is folded in the wide or free-space axis of the laser. This fold pattern can be contrasted with other prior art efforts to fold the beam in the waveguide axis.

In the prior art design described in U.S. Pat. No. 5,123,028, the beam path within the resonator can be considered a two pass configuration. In contrast, when using two mirrors at each end of the electrodes as shown in FIG. 1, the beam will traverse the discharge region six times, effectively increasing the path length by a factor of three which provides a number of benefits discussed in greater detail below.

FIGS. 2a to 2d illustrate the folded beam path. These views are a top plan representations of the laser illustrated in FIG. 1 and show the propagation of the beam in the free space axis. As noted above, in the narrow axis, the beam propagates in the waveguide mode. In these drawings, the mirrors appear planar but are actually spherical.

Figure 2A:
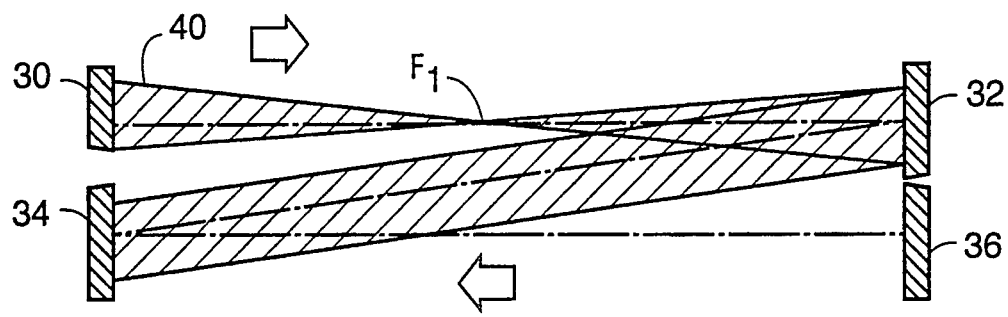
FIG. 2 is a schematic illustration of the folded path of the laser beam, with FIG. 2a showing the first two paths, FIG. 2b and 2c showing the third and fourth paths respectively, and FIG. 2d illustrating the fifth and sixth paths and the outcoupling of the beam from the resonator.

In FIG. 2a, the beam 40 is shown originating on mirror 30 and moving along a first direction, to mirror 32 and through a first focus $F_1$. The beam 40 then reflects off mirror 32 and is directed downwardly to mirror 34 in a substantially collimated fashion. It should be appreciated that if mirror 32 had been tilted upwardly so that the second pass was directed towards mirror 30, the beam propagation characteristics would be identical to the prior art, two mirror, negative branch unstable resonator design. By using mirror curvatures and positioning which maintains the characteristics of the negative branch unstable resonator through each pass, alignment stability is not sacrificed even though the beam is folded into a multiple passes.

Figure 2B:
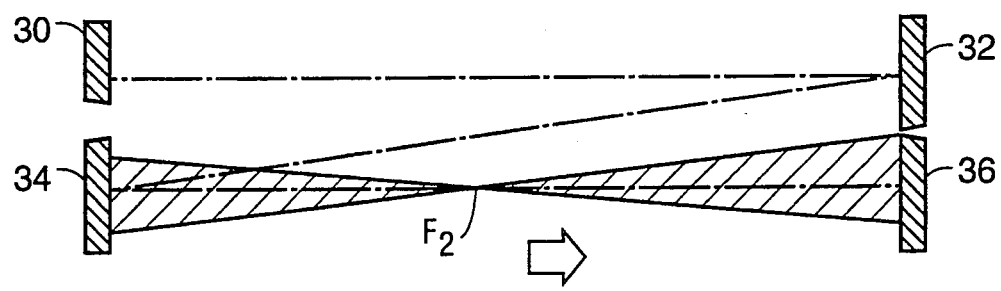
Figure 2C:
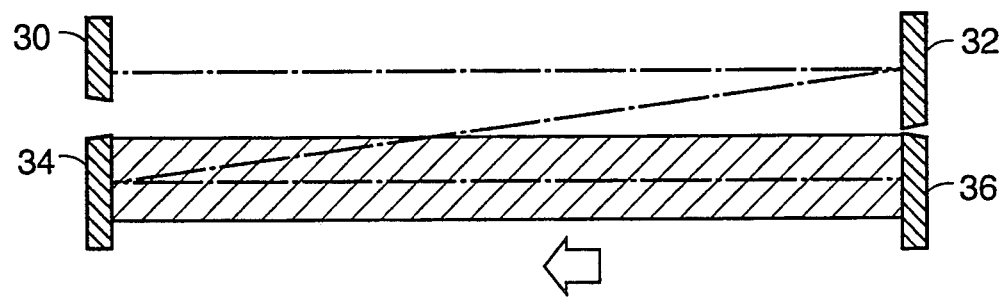
Figure 2D:
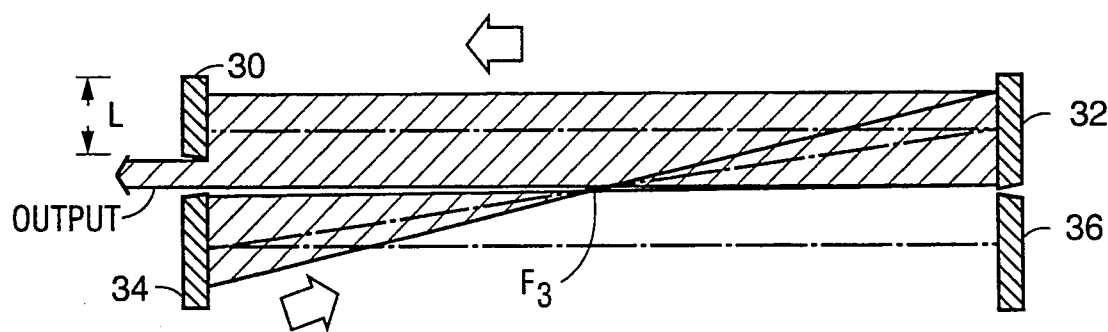

FIG. 2b illustrates the third pass of the beam from mirror 34 to mirror 36. The beam comes to a second focus at point $F_2$. FIG. 2c illustrates the collimated beam returning to mirror 34. In FIG. 2d, the beam is directed from mirror 34 back up to mirror 32. Along this fifth pass, the beam is focused at point $F_3$. Upon reaching mirror 32, the beam is then reflected back towards mirror 34 in substantially collimated fashion.

As is well known for these type of resonator designs, the width of the beam will increase upon each pass due to the magnification provided by the curvature of the mirrors. Thus, when beam 40 reaches mirror 30 as shown in FIG. 2d, its width will be greater than when it first originated from that mirror surface. For this reason, the beam can be coupled out of the resonator along the edge of mirror 30 in a well known edge coupled manner.

In the embodiment illustrated in FIG. 2, the length L of mirror 30 is less than the length of the other mirrors. In addition, mirror 30 is positioned such that a space is defined between mirror 30 and the adjacent mirror 34. By this arrangement, the beam 40 can by coupled out of the resonator near the center of the discharge space rather than at an edge.

Coupling out of the center of the discharge space can provide some practical advantages. More specifically, it is often easier to design optical systems for a beam that is coupled out of the center of a laser housing. In addition, by coupling out near the center of the discharge, diffraction effects from the edge of the slab can be avoided.

The center coupling approach is particularly preferred for use with the resonator of the subject invention because it helps to simplify the mounting of mirror 30. More specifically, if a resonator were configured so that the beam is coupled past the outer edge of mirror 30 (as in FIG. 5, below), the accuracy of the position of both the inner and outer edges of mirror 30 would be critical. The outer edge of mirror 30 must be accurately located to properly couple the beam out of the resonator. In addition, the inner edge of mirror 30 must be positioned accurately with respect to mirror 34 (See FIG. 5).

In contrast, in a center coupling configuration, only the inner edge of mirror 30 needs to be accurately positioned. The outer edge of mirror 30 (just like the outer edges of mirrors 32, 34 and 36) simply extends beyond the discharge region and beyond the beam path and therefore the position of the outer edge is not critical.

One significant advantage to the subject folded resonator design disclosed herein is that the multiple beam path increases the length of the resonant cavity without increasing the size of the discharge region. As is well known, the number of longitudinal modes which can be supported by an oscillator is directly proportional to the length of the cavity. Thus, by using a four mirror design, which triples the path length of the laser, the number of longitudinal modes which can oscillate will also be tripled.

The increase in the number of longitudinal modes significantly improves the power stability performance of the laser. More specifically, in the new design, the increase in oscillating modes tends to minimize any power fluctuations which can occur due to mode sweeping as the length of the cavity changes during operation. In initial testing, it has been found that with the new design, output power variations did not exceed one percent. This is a large improvement over the prior design where the power output tended to fluctuate by as much as ten to fifteen percent.

Another advantage achieved by increasing the number of longitudinal modes which can oscillate in the laser is that more output frequencies are available. This will improve the tunability of the laser during single line operation.

The subject compound resonator design should also be contrasted with prior art folded designs which merely used flat fold mirrors. These prior art designs, which also functioned to increase the path length within the laser, also had significant alignment problems. More specifically, when flat reflectors are used to turn a beam in the resonator, the alignment sensitivity increases because any angular tilt in a flat mirror will produce twice the change in angular tilt in a reflected beam. Where multiple flat mirrors are supported by a single, common mount, any misadjustment of the mount will be amplified many times, creating significant alignment errors. In contrast, by utilizing curved mirrors, and essentially emulating a negative branch unstable resonator along each path, the laser remains extremely stable. As noted above, in this design, one focal point exists between each pair of mirrors bounding a path of the beam. In the preferred embodiment, the path defined by each mirror set is a confocal design which maximizes alignment stability.

Another advantage to multiple mirror designs is that it will allow the width of the slab discharge to be expanded as desired without encountering problems associated with spherical aberration. More specifically, and as noted above, in the prior art, as the electrode width was increased, the mirror width had to be increased as well. Increasing the mirror width introduced unwanted spherical aberrations into the optical system. This increasing spherical aberration placed a limit on the maximum width of the slab discharge region.

In contrast, in the subject design, by using multiple mirrors across the width of the discharge, the width of the individual mirrors does not have to be increased. Rather, as the width of the of the electrodes are increased, the number of mirrors used at each end can be increased while maintaining the desired low level of spherical aberration. In fact, the use of multiple mirrors would allow the width of individual mirrors to be reduced. By using a multiple mirror resonator, it is now possible to design a laser with a much wider discharge region. It is envisioned that this approach would permit a laser to be designed with square electrodes, (i.e. where both the width and length of the electrodes were the same.) In a laser with square electrodes, the discharge area (width times length) will be maximized for a given length. Various six and eight mirror designs are illustrated and discussed below.

The subject compound resonator may also have utility with other types of lasers which have slab discharge regions. Thus, it would be possible to have a solid state slab material located between the mirrors illustrated in FIG. 2. This concept would be an extension of the hybrid resonators used with solid state lasers of the type described in U.S. Pat. No. 4,559,627, issued Dec. 17, 1985 to Chun.

Figure 3:
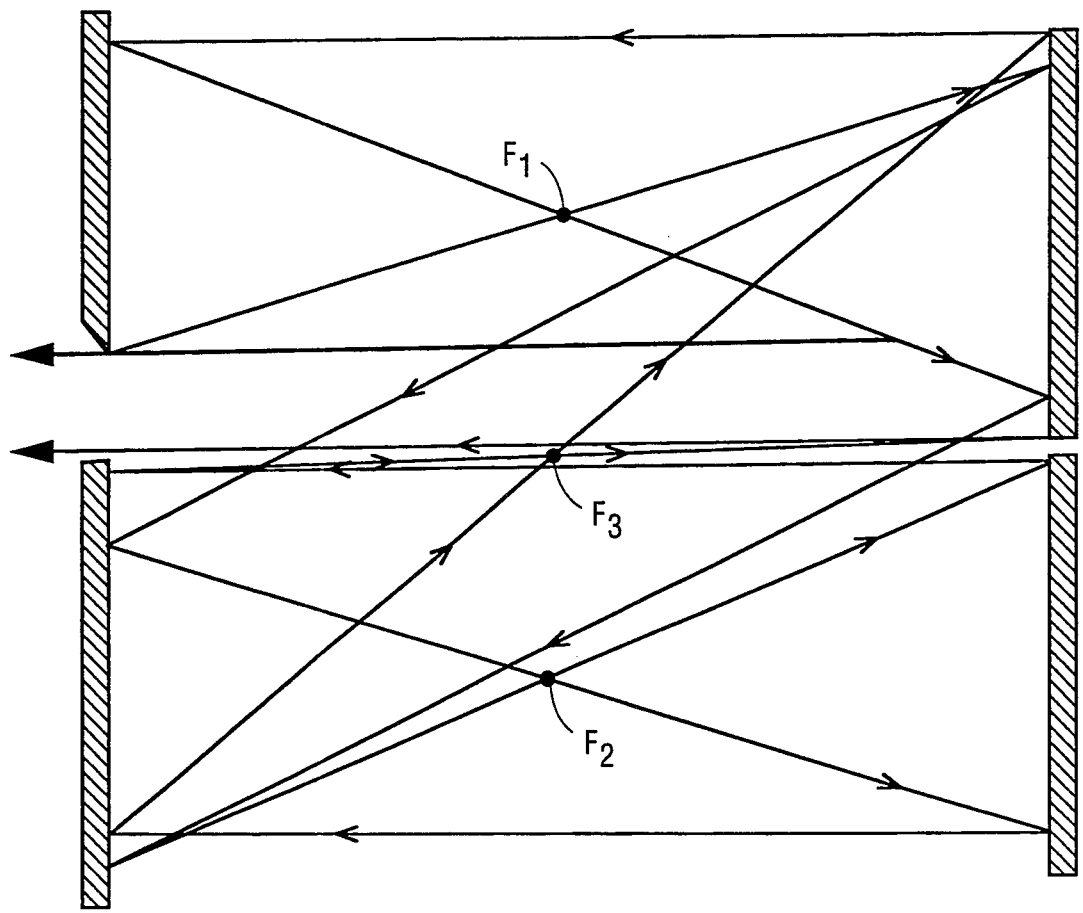
FIG. 3 is an illustration similar to FIG. 2 wherein all of the paths of the beam are illustrated in a single view.
Figure 4:
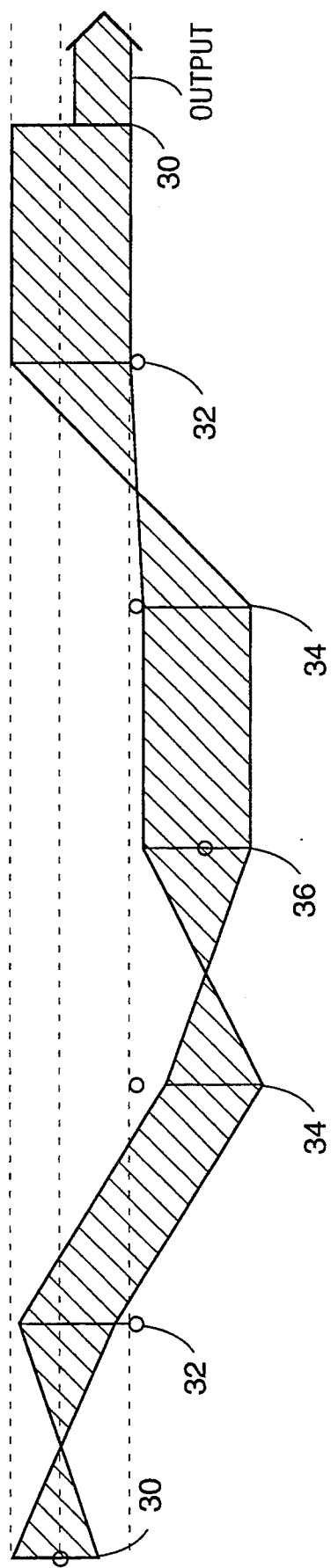
FIG. 4 is an illustration of a four mirror resonator where the beam path is unfolded to illustrate a linear progression.

FIG. 3 is an illustration similar to FIG. 2 wherein all of the paths of the beam are illustrated in overlapping fashion in a single view. In FIG. 4, the paths of the beam are unfolded to show a linear progression of the beam.

Figure 5:
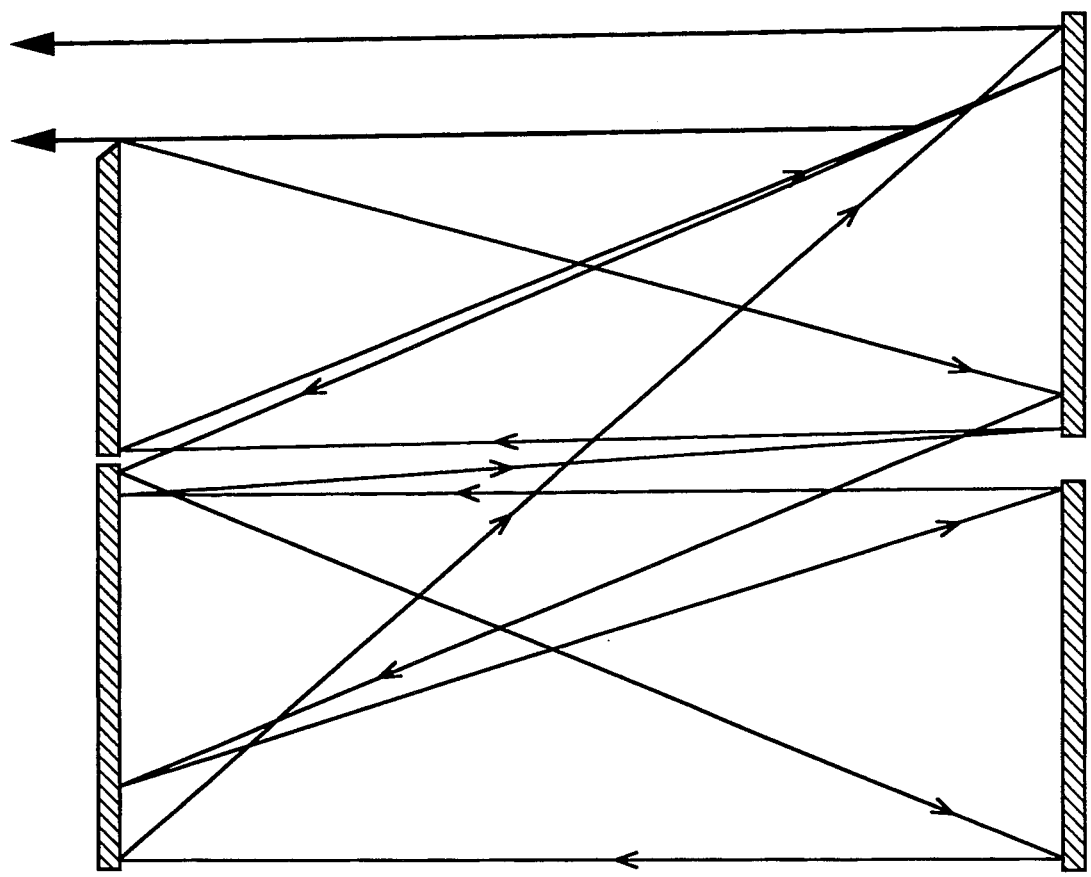
FIG. 5 is an illustration similar to FIG. 3 except that the beam is shown coupled out along the outside edge of the discharge region.

FIG. 5 is an illustration similar to FIG. 3 except that the beam is shown coupled out along the outside edge of mirror 30. In this configuration, mirror 30 is positioned closer to mirror 34 so that the magnified and expanded beam can be coupled out of the resonator past the outer edge of mirror 30.

Figure 6:
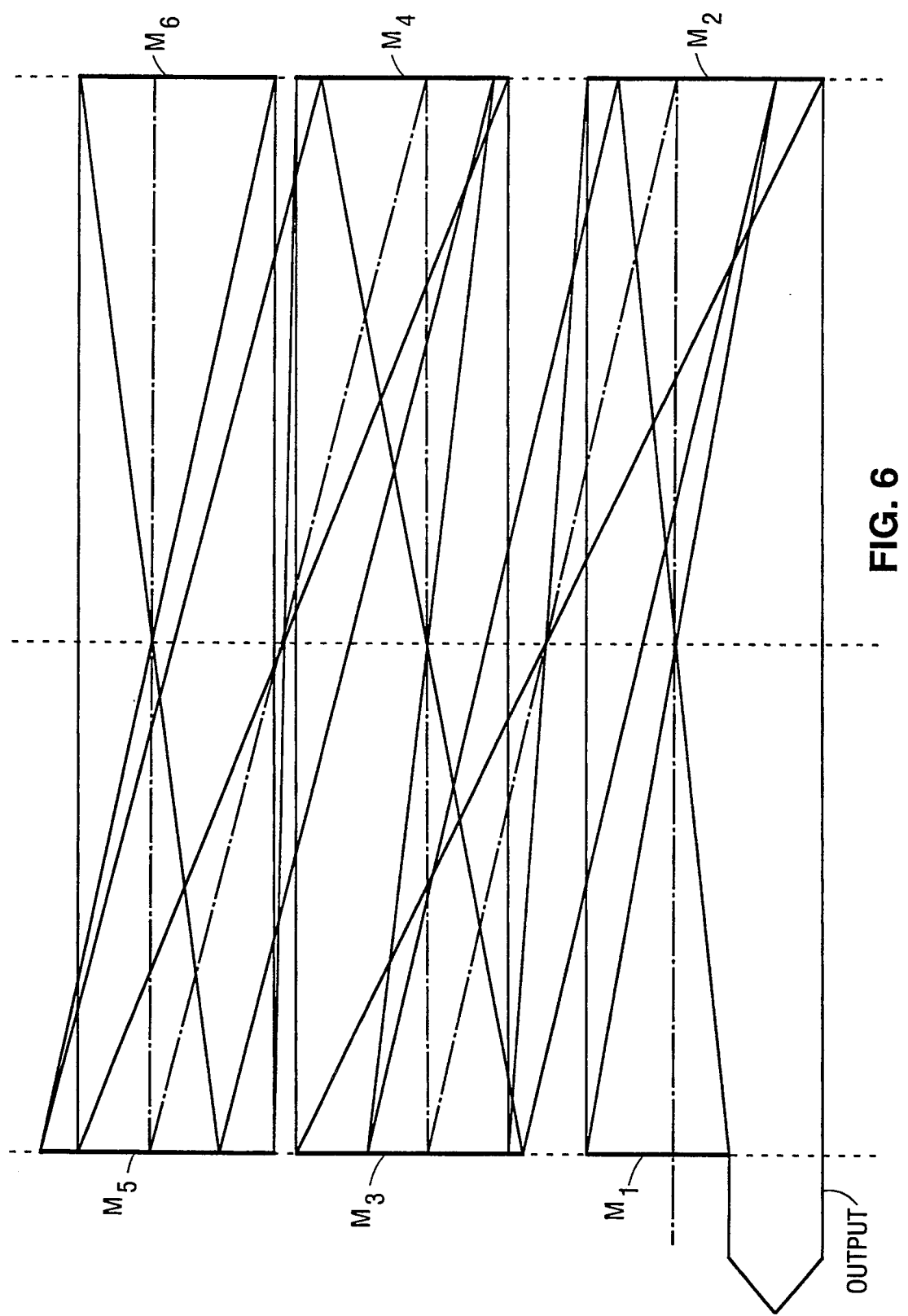
FIG. 6 is an illustration of the beam path in a six mirror resonator design wherein three mirrors are located at each end of the discharge region and the beam is coupled out past the inner edge of outer mirrors.
Figure 7:
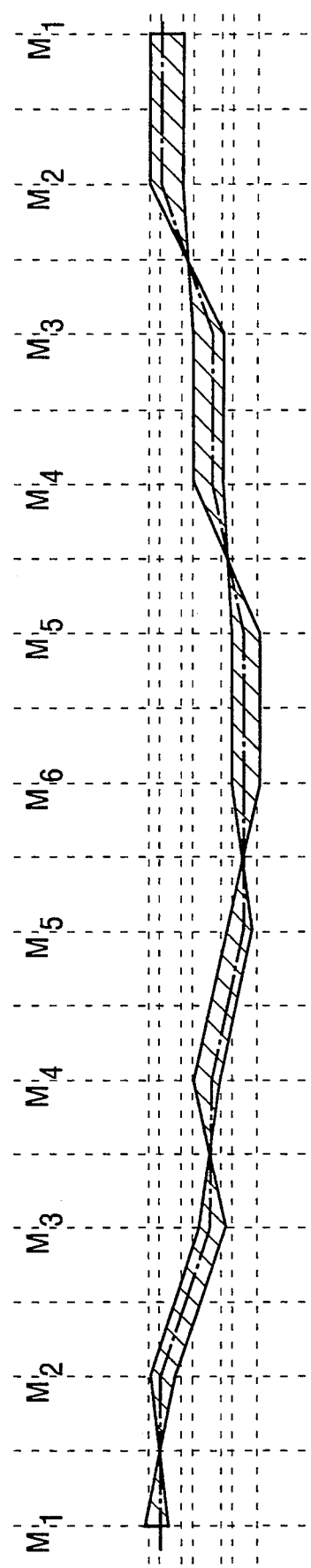
FIG. 7 shows the resonator of FIG. 6 with the beam path unfolded.

FIG. 6 is an illustration of the beam path in a six mirror ($M_1$–$M_6$) resonator where three mirrors are located at each end of the slab. In this embodiment, the beam will traverse the discharge space ten times before being coupled out of the resonator. Output coupling for this embodiment is along the edge of the slab discharge, past mirror $M_1$. By moving the position of mirror $M_1$, the beam could be coupled out of the resonator between mirrors $M_1$ and $M_3$. FIG. 7 shows the resonator of in FIG. 6 with the beam path unfolded.

Figure 8:
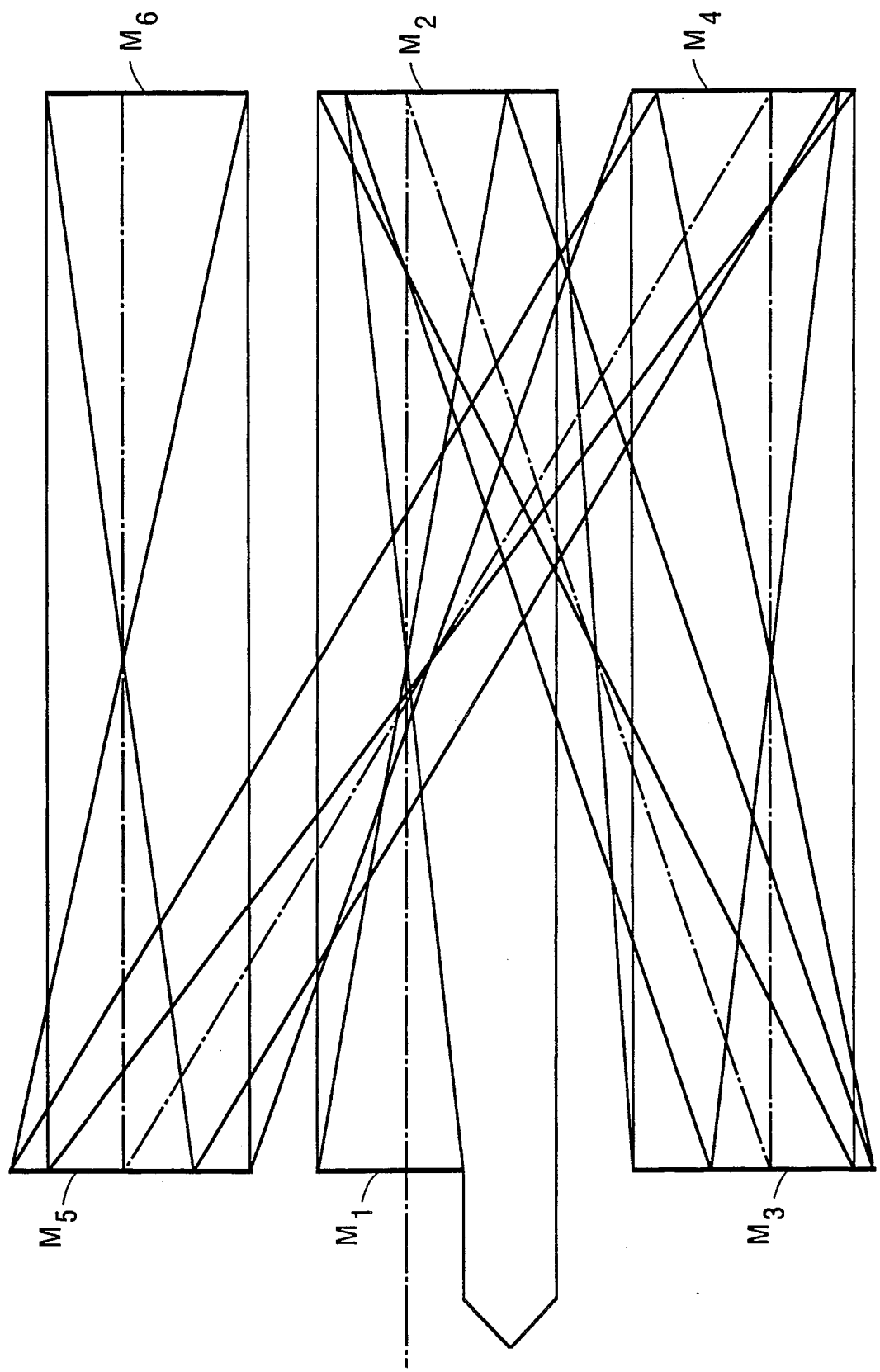
FIG. 8 is an illustration similar to FIG. 6 of a six mirror resonator design wherein the beam is coupled out past the edge of one of the inner mirrors.

FIG. 8 is another example of a six mirror ($M_1$–$M_6$) resonator design. As in the FIG. 6 embodiment, the beam traverses the discharge region ten times. However, in this embodiment, the angles of the mirrors are selected so that a different beam pattern is created. More specifically, in this embodiment, the beam path begins at a center mirror $M_1$ and extends to mirror $M_4$ in a manner similar to the four mirror embodiment of FIG. 2. Mirror $M_4$ is angled in a manner to reflect the beam diagonally across the discharge region to mirror $M_5$. Mirrors $M_4$ and $M_5$ (like all other mirror pairs bounding a beam path) are in a confocal, negative branch unstable resonator configuration.

Mirror $M_5$ directs the beam to mirror $M_6$. After the beam reaches mirror $M_6$, it is reflected back to mirror $M_1$ via mirrors $M_5$, $M_4$, $M_3$ and $M_2$ respectively. The beam is then coupled out of the resonator past an edge of mirror $M_1$. As can be appreciated from the FIG. 8 embodiment, the subject design accommodates a number of different beam paths and permits output coupling past the edge of any mirror.

Figure 9:
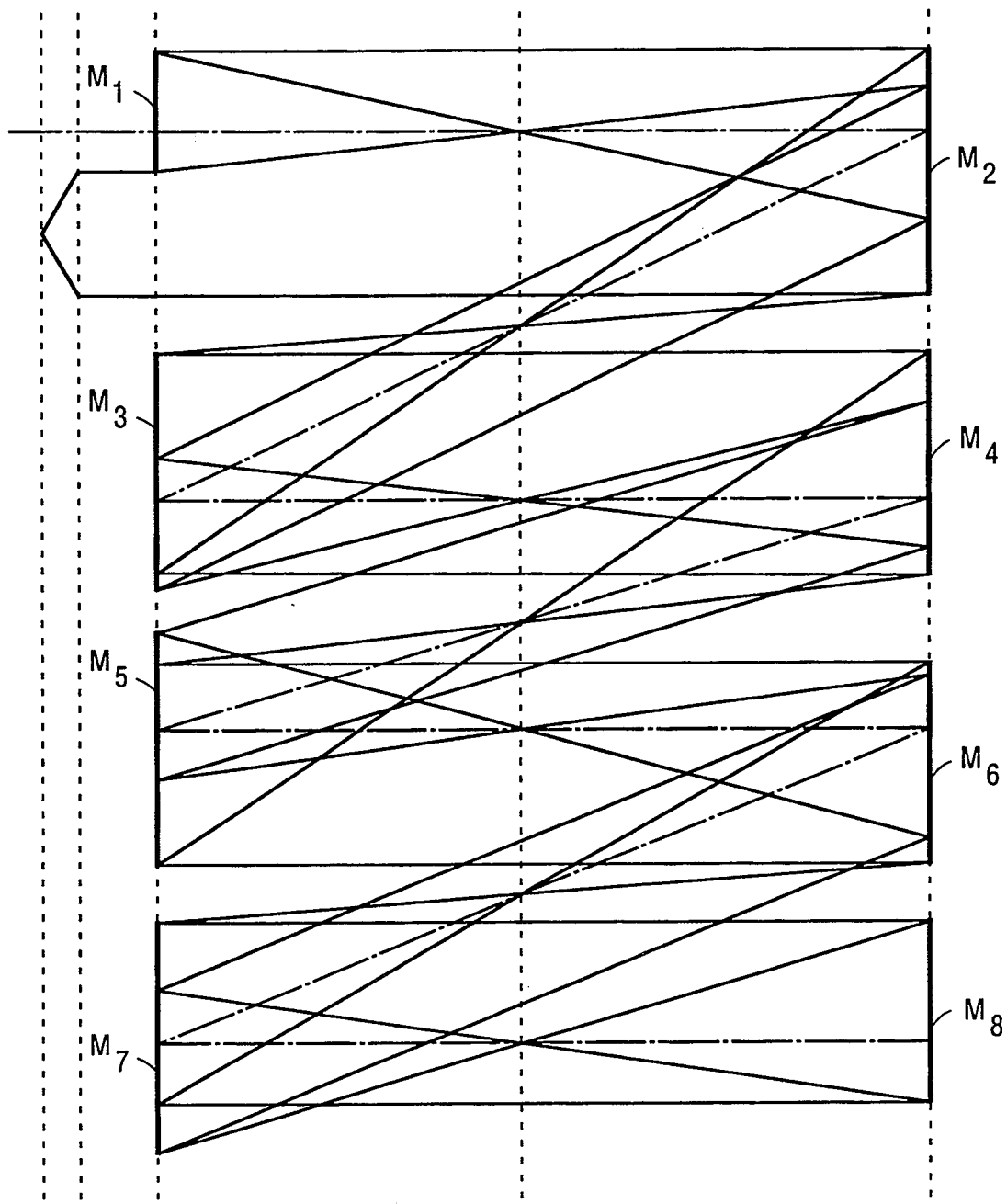
FIG. 9 is an illustration of the beam path in an eight mirror resonator design wherein four mirrors are located at each end of the discharge region.

FIG. 9 illustrates an eight mirror ($M_1$–$M_8$) resonator design with four mirrors being located at either end of the resonator. In this embodiment, the beam is folded through fourteen passes through the resonator. The beam is coupled out of the resonator past the interior edge of mirror $M_1$. It should be appreciated that for each additional mirror set (i.e. one extra mirror at each end of the resonator) the number of times the beam passes back and forth within the discharge region is increased by four.

FIGS. 10 through 15 illustrate one preferred embodiment of a laser utilizing the subject resonator and including hardware which can be used to mount a pair of mirrors at the ends of the electrodes. This embodiment is substantially the same as the laser described in the above cited U.S. Pat. No. 5,123,028 except for the improved mirror mounts.

Figure 10:
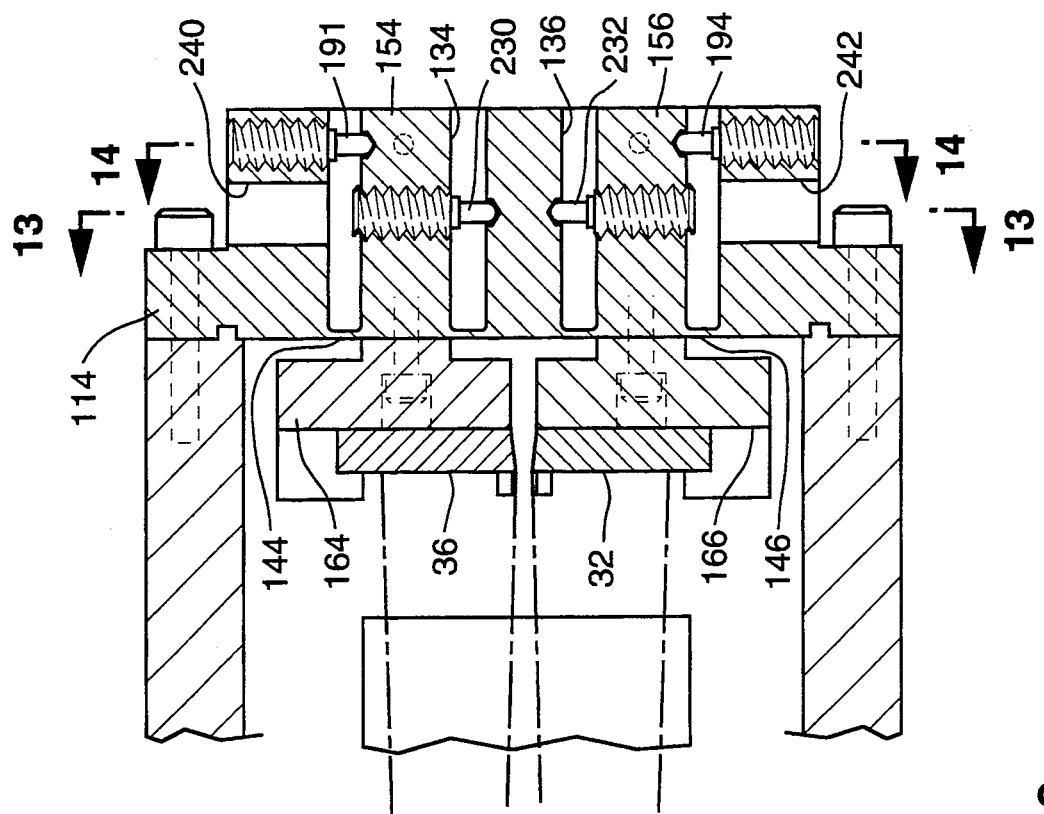
FIGS. 10 through 15 illustrate a preferred embodiment for mounting a pair of mirrors at the end of the electrodes in a sealed gas laser.
Figure 10:
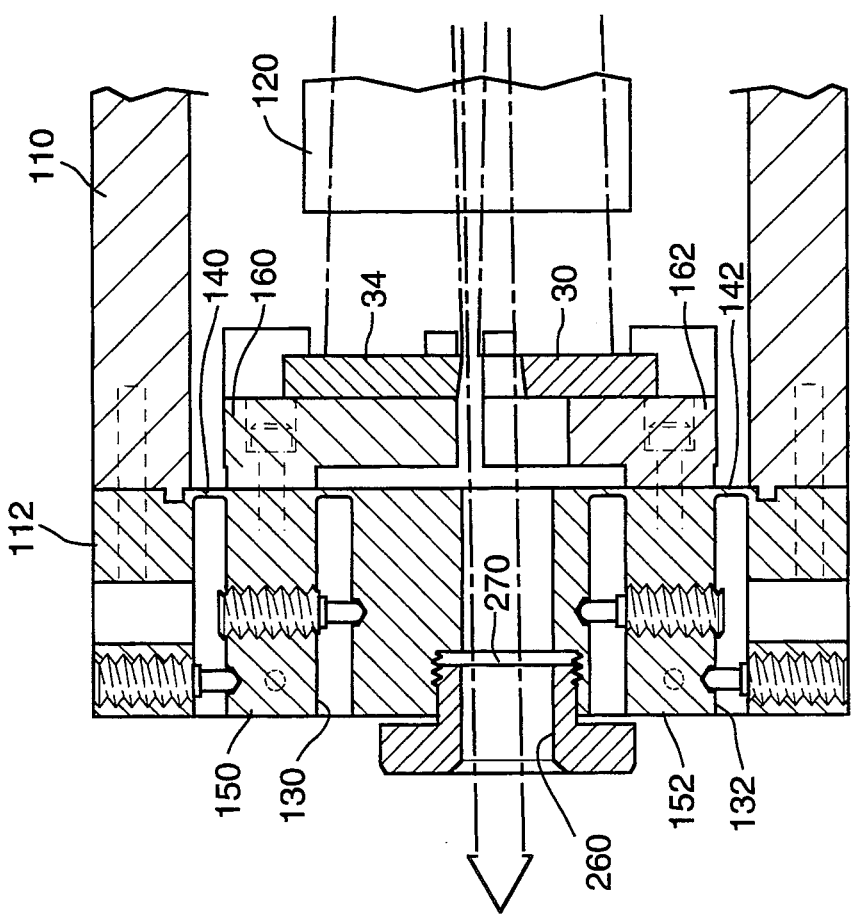
Figure 12:
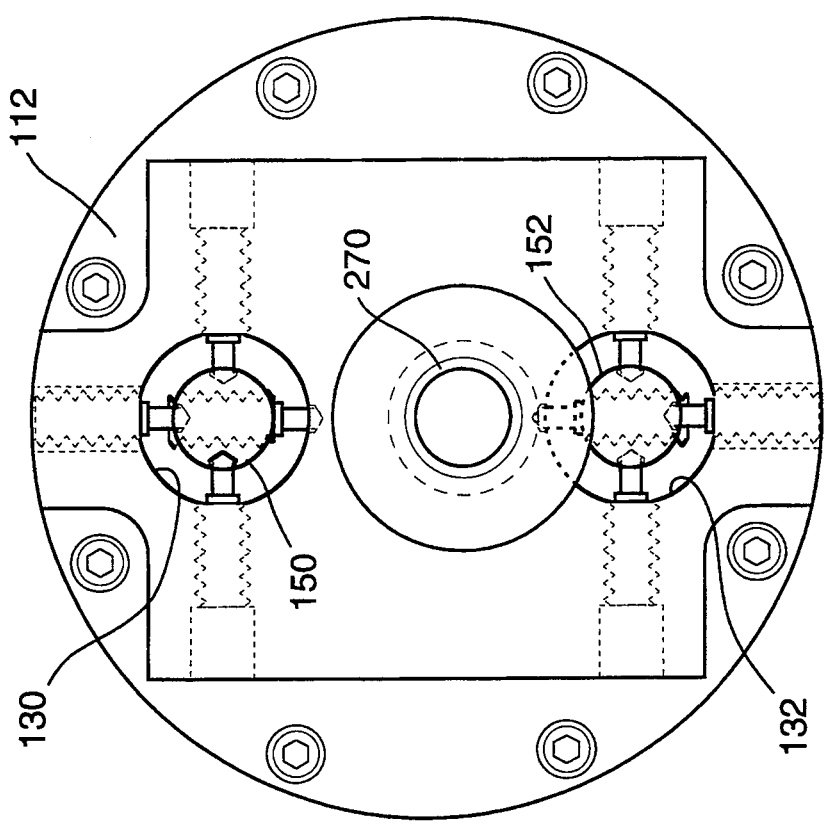
Figure 11:
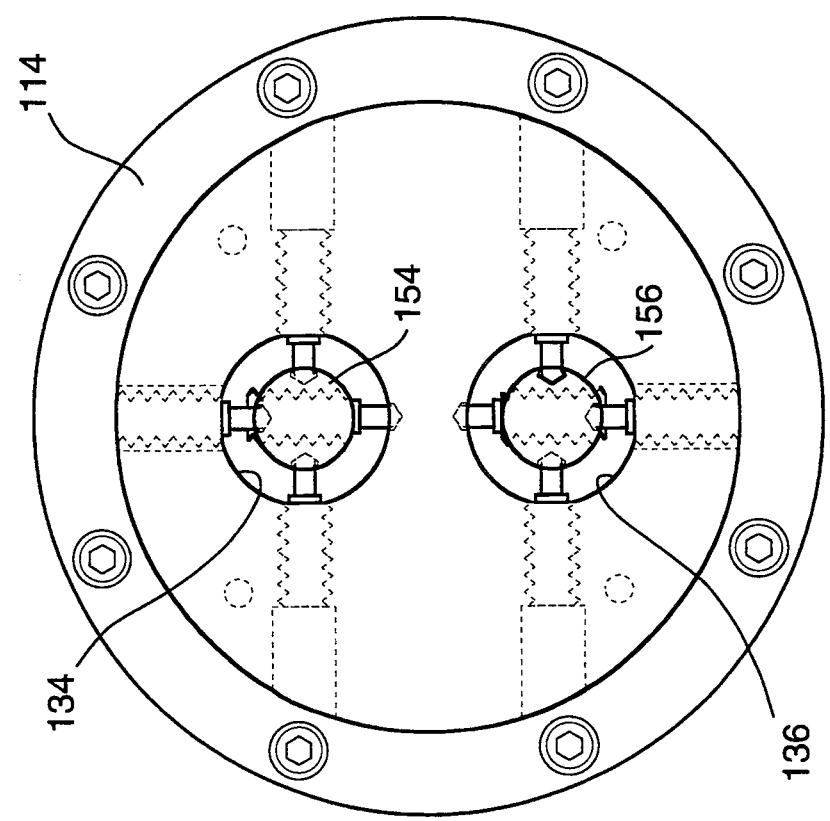

Referring first to FIG. 10, there is illustrated an aluminum housing 110 which is vacuum sealed by a pair of end plates 112 and 114. A pair of electrodes 120 (only one shown) are kinematically mounted within the housing. RF energy is coupled into the housing through appropriate feedthroughs. A carbon dioxide lasing gas is sealed within the housing. The lasing mixture typically includes helium, nitrogen and carbon dioxide at a ratio of 3:1:1, and may also include some xenon.

In accordance with the subject invention, the resonator is defined by a two mirrors (30, 32, 34, 36) mounted adjacent each end of the electrodes. As described in U.S. Pat. No. 5,123,028, the curvature of the spherical mirrors is determined based on the magnification desired in the unstable resonator axis. Thereafter, the spacing between the ends of the electrodes and the mirrors is selected so that the radius of curvature of the wavefront of the beam (in the narrow axis) as it reaches the mirrors matches the radius of curvature of the mirrors.

The mirror mounting hardware serves a similar function as in the prior art, which allows the angle of the mirror to be adjusted from outside of the sealed housing. To achieve this goal, each end plate 112, 114 includes a pair of circular grooves, 130, 132, 134 and 136. Each groove extends towards the inner surface of the end plate an amount sufficient to define an annular flexture region 140, 142, 144 and 146. The grooves also define an axially extending tilt member 150, 152, 154, and 156 located radially inside the groove.

A mirror mount 160, 162, 164 and 166 is connected to the inner surface of the end plate and aligned with the associated tilt member. The mirrors 30, 32, 34 and 36 are supported by the mounts. As can be appreciated, by adjusting the angle of a tilt member about the annular flexture region, the angle of the mirror can be adjusted.

As in the prior art design, a plurality of screws and pins are used to adjust the angle of the tilt members to vary the angle of the mirrors. In the prior art, this result was achieved using four orthogonal pins for directly biasing the tilt member. This prior design has been modified in order to allow two mirrors to be mounted at each end of the housing.

The new design will described with reference first to end plate 114. As illustrated most clearly in FIGS. 13 and 15, end plate 114 is provided with six threaded openings (170, 171, 172, 173 174 and 175) lying in a first plane. Each opening receives a screw (180, 181, 183, 184, and 185) that carries a biasing pin (190, 191, 192, 193, 194 and 195). The axial position of a pin is adjusted by rotating a screw which, in turn, exerts a biasing force on the associated tilt member thereby varying the angle of the tilt member and the associated mirror.

As can be seen, the three coplanar screws associated with each mirror permit angular adjustment of that mirror in three out of the four necessary axes. The remaining axis of adjustment for either mirror lies along a line occupied by the remaining mirror on end plate 114 so that it is not possible to simply use a fourth biasing pin and screw in the same manner as in the prior art.

Figure 14:
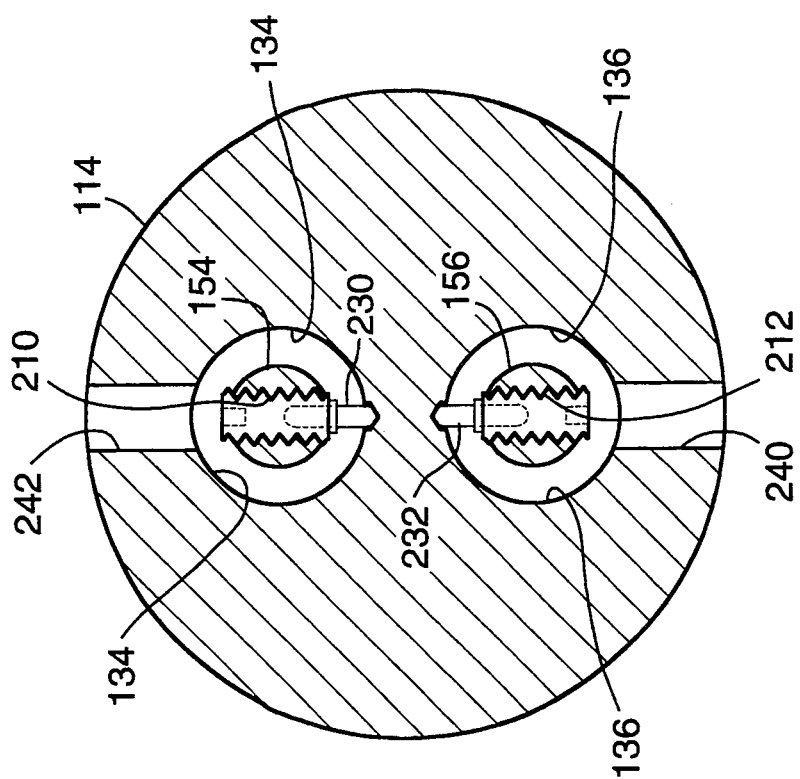
Figure 13:
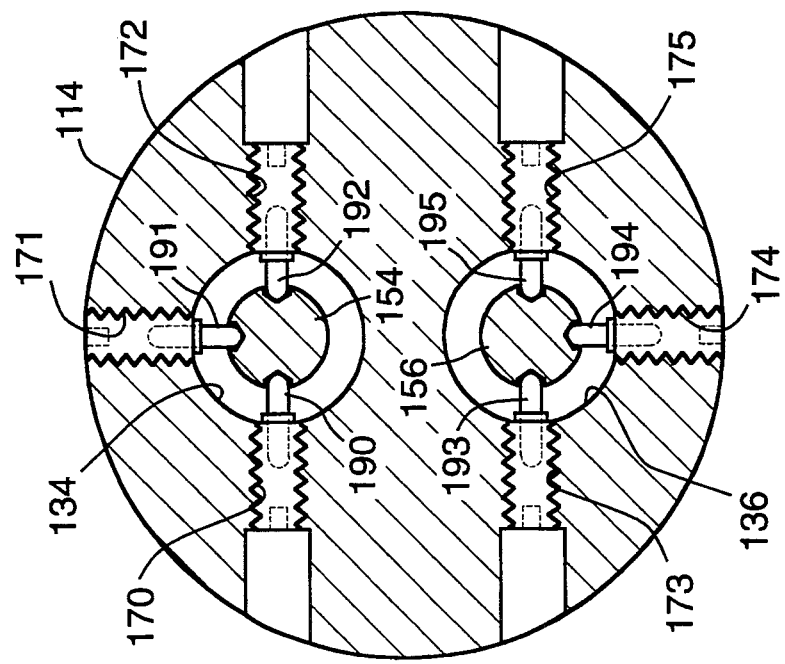
Figure 15:
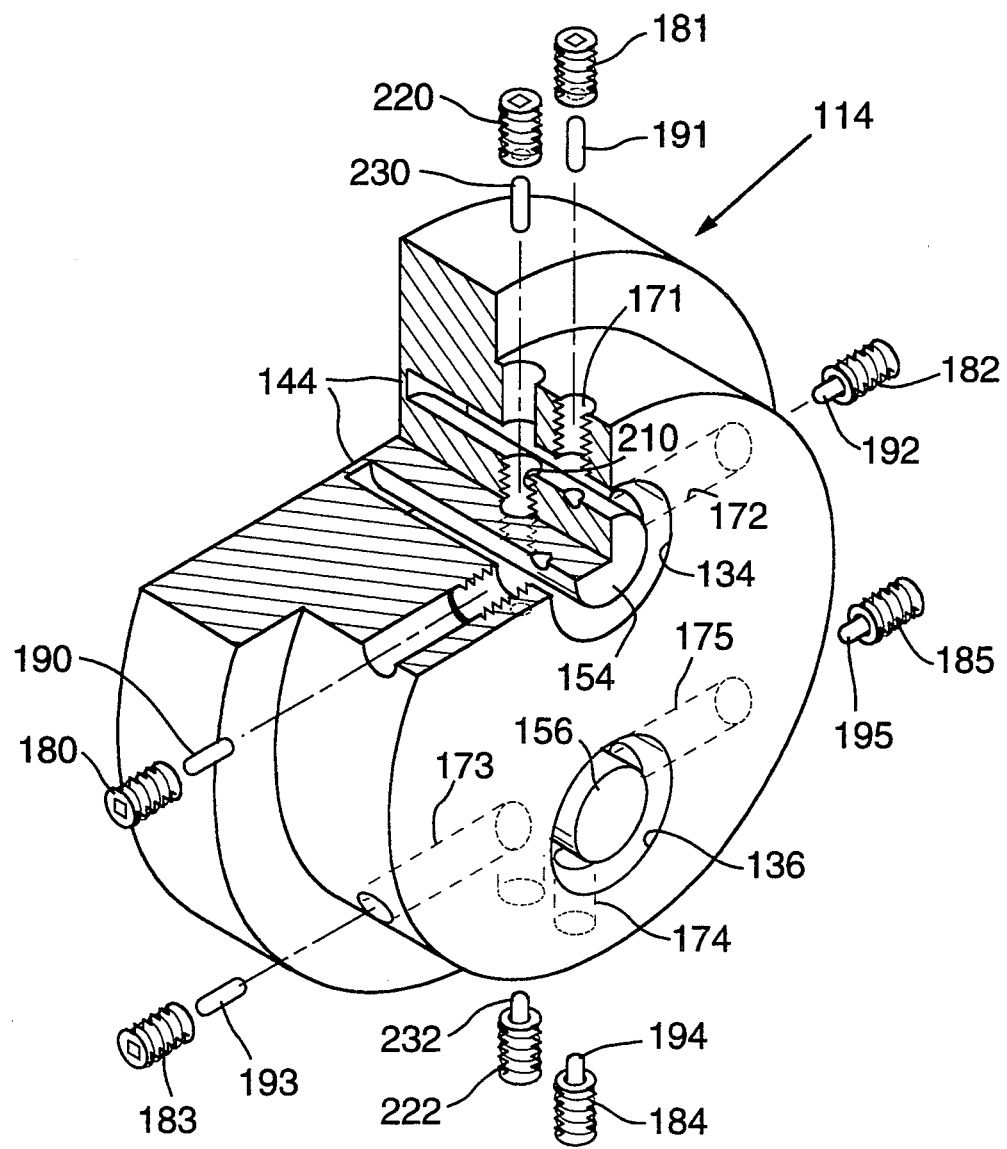

Accordingly, in order to provide adjustment along the remaining fourth axis, a reverse biasing screw is used. More specifically, and as best seen in FIGS. 14 and 15, each tilt member 154, 156 is further provided with a threaded opening 210, 212 which receives a threaded screw 220, 222 and associated pin 230, 232. A non-threaded aperture 240, 242 is provided in the end plate to access screws 220, 222. The threaded openings 210 and 212 lie in a plane which is parallel to but spaced from the plane of threaded opening 170–175 allowing unrestricted axis to screws 220, 222. By rotating screw 220, 222, pin 230, 232 will be biased against the radially outer surface of groove 134, 136 thereby placing a torque on the associated tilt member. By adjusting the four screws associated with each tilt member, the desired angle of the mirror can be obtained from outside of the sealed housing.

End plate 112 differs from end plate 114 in that the beam is coupled out of the housing through end plate 112. As seen in FIG. 10, the inner edge of mirror 30 is shortened providing an opening through which the beam can be coupled out of the resonator. End plate 112 includes a channel 260 through which the beam can pass. A transparent window 270, formed from a material transmissive to 10.6 micron radiation, is sealed within channel 260.

The mirror mounting structure illustrated in FIGS. 10 to 15 provides a suitable vehicle for implementing the compound resonator structure of the subject design. A laser formed in accordance with these teachings was built and tested. The laser had a pair of mirrors (30-36) at each end of the electrodes to create a folded beam path. Each of the mirrors were spherical, with mirrors 30 and 34 having a curvature of 619 mm and mirrors 32 and 36 having a curvature of 693 mm. The mirrors were separated by 655 mm. Mirrors 32 and 34 were tilted towards each in a manner to create a confocal resonator therebetween. The angle of tilt was on the order of 17 milliradians. Some additional minor angular adjustments were made to each of the mirrors during set-up in order to stabilize the cavity and maximize laser power output as is well known in the art. During a twenty-four period of continuous operation, the power fluctuations of the laser did not exceed one percent.

While the subject invention has been described with reference to the preferred embodiments, various changes and modifications could be made therein, by one skilled in the art, without varying from the scope and spirit of the subject invention as defined by the appended claims.

We claim:

1. A gas laser comprising:
  a pair of elongated electrodes, said electrodes being spaced apart to define a discharge region therebetween, said discharge region having a slab configuration with a wide axis and a narrow axis;
  a lasing gas disposed between said electrodes;
  means for energizing the electrodes to excite the gas and generate a gas discharge; and
  resonator means for generating a laser beam, said resonator means including at least two separate mirrors disposed at each end of said electrodes, said mirrors having an angular orientation and curvature to define a waveguide region in the narrow axis between the entire surfaces of said electrodes and free space propagation in the wide axis and wherein the mirrors cooperate to fold the beam along multiple paths in the wide axis with each path extending between mirrors at opposite ends of said electrodes and wherein said beam paths sweep through the entire discharge region bounded by the mirrors.

2. A laser as recited in claim 1 wherein an unstable resonator is defined in the wide axis.

3. A laser as recited in claim 1 wherein a negative branch unstable resonator is defined in the wide axis.

4. A laser as recited in claim 1 wherein there is a focal point located between every pair of mirrors bounding a beam path.

5. A laser as recited in claim 4 wherein the mirrors bounding each pass are in a confocal arrangement.

6. A laser as recited in claim 1 wherein the beam is coupled out of the resonator means along the edge of one of said mirrors.

7. A laser as recited in claim 6 wherein the beam is coupled out of the resonator means adjacent a side edge of wide axis of the discharge region.

8. A laser as recited in claim 6 wherein the beam is coupled out of the resonator means at a position intermediate the wide axis of the discharge region.

9. A laser as recited in claim 1 wherein a space is defined between the mirrors at one end of the electrodes for coupling the laser beam out of the resonator.

10. A laser as recited in claim 1 wherein there are only two mirrors at each end of the electrodes to define a six pass beam propagation pattern within the discharge region.

11. A laser as recited in claim 1 wherein there are three mirror at each end of the electrodes to define a ten pass beam propagation pattern within the discharge region.

12. A gas laser comprising:
  a pair of elongated electrodes, said electrodes being spaced apart to define a discharge region therebetween, said discharge region having a slab configuration with a wide axis and a narrow axis;
  a lasing gas disposed between said electrodes;
  means for energizing the electrodes to excite the gas and generate a gas discharge; and
  resonator means for generating a laser beam, said resonator means including at least two separate mirrors disposed at each end of said electrodes, said mirrors having an angular orientation and curvature to define a hybrid resonator that is stable in the narrow axis and unstable in the wide axis and wherein the mirrors cooperate to fold the beam along multiple paths in the wide axis, with each path extending between mirrors at opposite ends of said electrodes and wherein there is a focal point located between every pair of mirrors bounding a beam path and wherein said beam paths sweep through the entire discharge region bounded by the mirrors.

13. A laser as recited in claim 12 wherein the spacing of the electrodes in the narrow axis is selected to define a waveguide.

14. A laser as recited in claim 12 wherein a negative branch unstable resonator is defined in the wide axis.

15. A laser as recited in claim 12 wherein the mirrors bounding each pass are in a confocal arrangement.

16. A laser as recited in claim 12 wherein the beam is coupled out of the resonator means along the edge of one of said mirrors.

17. A laser as recited in claim 16 wherein the beam is coupled out of the resonator means adjacent a side edge of wide axis of the discharge region.

18. A laser as recited in claim 16 wherein the beam is coupled out of the resonator means at a position intermediate the wide axis of the discharge region.

19. A laser as recited in claim 16 wherein a space is defined between the mirrors at one end of the electrodes for coupling the laser beam out of the resonator.

20. A laser as recited in claim 16 wherein there are only two mirrors at each end of the electrodes to define a six pass beam propagation pattern within the discharge region.

21. A laser as recited in claim 16 wherein there are three mirror at each end of the electrodes to define a ten pass beam propagation pattern within the discharge region.

22. A gas laser comprising:
  a pair of elongated electrodes, said electrodes being spaced apart to define a discharge region therebetween, said discharge region having a slab configuration with a wide axis and a narrow axis;
  a lasing gas disposed between said electrodes;
  means for energizing the electrodes to excite the gas and generate a gas discharge; and
  resonator means for generating a laser beam, said resonator means including at least two separate mirrors disposed at each end of said electrodes, said mirrors having an orientation and curvature to define a hybrid resonator that is stable in the narrow axis and a negative branch unstable resonator in the wide axis and wherein the mirrors cooperate to fold the beam along multiple paths in the wide axis with each path extending between mirrors at opposite ends of said electrodes and wherein said beam paths sweep through the entire discharge region bounded by the mirrors.

23. A laser as recited in claim 22 wherein the spacing of the electrodes in the narrow axis is selected to define a waveguide.

24. A laser as recited in claim 22 wherein there is a focal point located between every pair of mirrors bounding a beam path.

25. A laser as recited in claim 24 wherein the mirrors bounding each pass are in a confocal arrangement.

26. A laser as recited in claim 22 wherein the beam is coupled out of the resonator means along the edge of one of said mirrors.

27. A laser as recited in claim 26 wherein the beam is coupled out of the resonator means adjacent a side edge of wide axis of the discharge region.

28. A laser as recited in claim 26 wherein the beam is coupled out of the resonator means at a position intermediate the wide axis of the discharge region.

29. A laser as recited in claim 22 wherein a space is defined between the mirrors at one end of the electrodes for coupling the laser beam out of the resonator.

30. A laser as recited in claim 22 wherein there are only two mirrors at each end of the electrodes to define a six pass beam propagation pattern within the discharge region.

31. A laser as recited in claim 22 wherein there are three mirror at each end of the electrodes to define a ten pass beam propagation pattern the discharge region.

32. A laser comprising:
a lasing medium having a slab shaped gain region having a wide and a narrow axis;
means for energizing the gain medium; and
resonator means for generating a laser beam, said resonator means including at least two separate mirrors located at opposed ends of the slab shaped gain region, said mirrors having an orientation and curvature to define a hybrid resonator that is stable in the narrow axis and unstable in the wide axis and wherein the mirrors cooperate to fold the beam along multiple paths in the wide axis with each path extending between mirrors at the opposed ends of the gain region and wherein there is a focal point located between every pair of mirrors bounding a beam path and wherein said beam paths sweep through the entire gain region bounded by the mirrors.

33. A laser as recited in claim 32 wherein a negative branch unstable resonator is defined in the wide axis.

34. A laser as recited in claim 32 wherein the mirrors bounding each pass are in a confocal arrangement.

35. A laser as recited in claim 32 wherein the beam is coupled out of the resonator means along the edge of one of said mirrors.

36. A laser as recited in claim 32 wherein a space is defined between the mirrors at one end of the discharge region for coupling the laser beam out of the resonator.

* * * * *